United States Patent [19]
Wong et al.

[11] Patent Number: 5,386,495
[45] Date of Patent: Jan. 31, 1995

[54] METHOD AND APPARATUS FOR DETERMINING THE SIGNAL QUALITY OF A DIGITAL SIGNAL

[75] Inventors: Chin P. Wong, Ft. Lauderdale; Gordon W. Chiu, Plantation, both of Fla.

[73] Assignee: Motorola, Inc., Schaumburg, Ill.

[21] Appl. No.: 11,597

[22] Filed: Feb. 1, 1993

[51] Int. Cl.⁶ .............. H04B 3/46; H04B 17/00; H04Q 1/20
[52] U.S. Cl. .................... 375/10; 455/67.1; 455/67.3; 375/99
[58] Field of Search .............. 455/63, 67.1, 67.3, 455/133, 134, 135, 226.1, 226.2, 226.3; 375/51, 57, 58, 99, 96, 10; 370/17

[56] References Cited
U.S. PATENT DOCUMENTS
| | | | |
|---|---|---|---|
| 4,581,767 | 4/1986 | Monsen | 455/67.1 |
| 5,054,035 | 10/1991 | Tarallo et al. | 375/116 |
| 5,251,237 | 10/1993 | Baier | 375/99 |

Primary Examiner—Stephen Chin
Assistant Examiner—Duane Kobayashi
Attorney, Agent, or Firm—Pedro P. Hernandez

[57] ABSTRACT

A receiver for receiving and decoding a carrier signal is described. The carrier signal is modulated with a digital signal. The receiver includes a receiver section (162) for demodulating the received carrier signal. The demodulated signal is then sent through an A/D converter (164) for converting the demodulated signal into a digital format. A digital signal processor (166) receives the digital format and calculates the autocorrelation function of the digital format. The digital signal processor (166) then computes the ratio of the autocorrelation at two different reference points and compares this value to a plurality of values stored in its memory locations. The plurality of stored values representing different signal quality measurements.

14 Claims, 5 Drawing Sheets

SIGNAL WITH NO NOISE ADDED

SIGNAL WITH 10DB S/N

SIGNAL WITH 6dB S/N

METHOD AND APPARATUS FOR DETERMINING THE SIGNAL QUALITY OF A DIGITAL SIGNAL

TECHNICAL FIELD

This invention relates in general to the field of radio communications, and more specifically to a method and apparatus for providing signal quality indication of digital signals which are received by a communication device.

BACKGROUND

In radio communication systems it is sometimes beneficial to provide radio users with some information about the received signal quality so that they can get some idea about how far they are away from the transmitting unit and take appropriate action before they are completely out of communication range. Signal quality information can also be used for other purposes such as, determining atmospheric conditions, determining if there are radio frequency "dead spots" in a certain system, etc.

In the case of digital radios, the received digital signals are usually error-corrected as part of the receiving protocol before the digital signals are heard or used by the radio users. Digital radio users cannot tell the signal quality from the error-corrected signal since voice data can still be recovered when the signal quality is poor.

A conventional bit error rate (BER) indicator as used in many well known digital radios, which is based on the output of the error control coding and the feedback error in the recovery loop of the digital receiver, can be used as the signal quality indicator. However, the calculation of the BER takes significant amount of time to calculate which uses up valuable radio processor time. A need thus exists for a simpler and more efficient method and apparatus for measuring digital signal quality.

SUMMARY OF THE INVENTION

Briefly, according to the invention, there is provided a method and apparatus for measuring the signal quality of a carrier signal modulated with an information signal. The method comprises the steps of: demodulating the carrier signal to recover the digital signal; calculating the autocorrelation function of the digital signal; and determining the signal quality of the digital signal using the autocorrelation function.

In another aspect of the present invention a receiver is described which can determine the signal quality of a received signal by determining the autocorrelation of the received signal.

DETAILED DESCRIPTION OF THE PREFERRED EMBODIMENT

Figure 1:
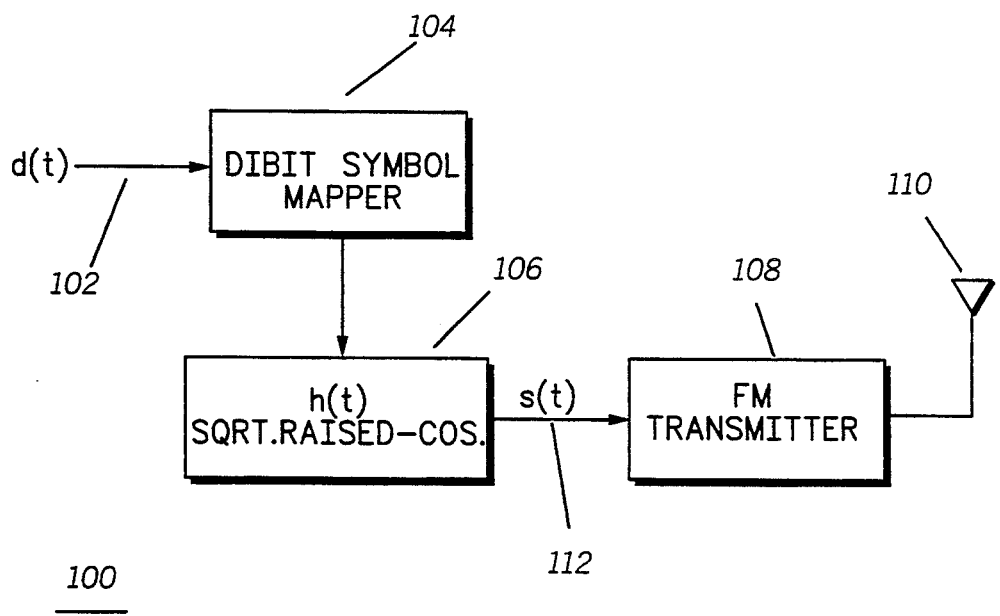
FIG. 1 is a simplified block diagram of a digital transmitter.

Referring first to FIG. 1, a digital transmitter 100 is shown to include a filter h(t) 106 and a Frequency Modulation (FM) transmitter 108. The input and output of the filter 106 are d(t) 202 and s(t) 112 respectively. In the preferred embodiment, the symbol rate is 4800 symbols/sec and the data is four level Frequency Shift Keying (FSK). Furthermore, filter h(t) 106 has an impulse response of the square-root of raised-cosine pulse. If the data d(t) 102 is randomly distributed and has a zero mean, the output s(t) 106 should have a spectrum H(w) where H(w) is the Fourier transform of h(t). Furthermore, since the auto-correlation function of s(t) 112 is defined as:

$$R_{yy}(\tau) = E[s(t)s(t+\tau)].$$

It can be shown that, $$R_{yy}(\tau) = R_{dd}(\tau) * h(t) * h'(-t)$$

where "'" denotes complex conjugate and "*" denotes convolution. If signal d(t) 102 is a Wide Sense Stationary (WSS) process, then $R_{dd}(\tau)$ statistically should only depend on "$\tau$". Since both h(t) and h'(−t) are deterministic, it implies that $R_{yy}(\tau)$ is also WSS. The signal s(t) 112 is applied to an FM transmitter 108 which has a set deviation level. The radio frequency (RF) signal output of transmitter 108 is a carrier signal which is transmitted via an antenna 110. The autocorrelation function can be stated as:

$$Corr(g, p) = \int_{-\infty}^{+\infty} g(t + \tau)p(t)dt.$$

The correlation is a function of "$\tau$", which is called the lag. In computational work, especially when dealing with experimental data, one is hardly ever given a continuous function p(t) to work with, but given, rather a list of measurements of $g(t_i)$ for a discrete set of t's. If "g" equals "p" in the above formula, then the function is correlated with itself and is called its autocorrelation.

If the autocorrelation function is implemented discretely, the following function can be used, assuming the term "N" is relatively large:

$$Corr(g, g) = \sum_{n=0}^{n=N-1} g(k + n)g(k)$$

The correlation is a function of k, which is expressed as sample delay.

By adding a noise term n(t) to the signal transmitted by transmitter 100 upon the signal being received at a receiver, the received signal becomes:

$$r(t) = s(t) + n(t), \text{ which becomes}$$

$$R_{rr}(\tau) = E[r(t)r(t+\tau)], \text{ and further expanded becomes}$$

$$R_{rr}(\tau) = R_{yy}(\tau) + E[n(t)s(t+\tau) + n(t+\tau)s(t) + n(t)n(t+\tau)].$$

If n(t) is randomly distributed, zero mean, and mutually independent of s(t), then, $E[n(t)s(t+\tau)] = E[n(t)]E[s(t+\tau)] = 0$, and $E[n(t+\tau)s(t)] = E[n(t+\tau)]E[s(t)] = 0$ Thus, $R_{rr}(\tau) = R_{yy}(\tau) + E[n(t)n(t+\tau)]$ for the case $\tau = 0$, $R_{rr}(0) = E[s(t)^2] + E[n(t)^2]$, further $E[s(t)^2] = R_{dd}(0)*h(t)*h'(-t)$.

Since $R_{dd}(\tau)$ depends on $\tau$, $R_{dd}(0)$ equals a constant, and $E[s(t)^2]$ equals a constant. Thus, the only element that can change $R_{rr}(0)$, is the noise power $E[n(t)^2]$. For the case $\tau \neq 0$, assuming the noise is uncorrelated $R_{rr}(\tau) = E[s(t)s(t+\tau)] = R_{dd}(\tau)*h(t)*h'(-t)$.

Notice that the noise term n(t) does not contribute to $R_{rr}(\tau)$ for $\tau \neq 0$. In other words, $R_{rr}(\tau)$ for $\tau \neq 0$, does not change with signal conditions. As long as $\tau$ does not change, $R_{rr}(\tau)$ will be kept constant. If $R_{rr}(0)$ and $R_{rr}(\tau)$ are arranged into a ratio:

$R_{rr}(0)/R_{rr}(\tau) = \{E[s(t)^2] + E[n(t)^2]\}/\{E[s(t)s(t+\tau)]\}$, then $R_{rr}(0)/R_{rr}(\tau) = K + E[n(t)^2]/E[s(t)s(t+\tau)]$, where $K = E[s(t)^2]/E[s(t)s(t+\tau)]$ equals a constant.

Since $E[n(t)^2]$ equals noise power, and $E[s(t)s(t+\tau)]$ is proportional to $E[s(t)^2]$, the signal power $R_{rr}(0)/R_{rr}(\tau)$ can be used as a signal to noise (S/N) ratio to show the quality of a received signal. The advantage of using $R_{rr}(0)/R_{rr}(\tau)$ as a S/N ratio is that no signal and noise power are required for computing the S/N ratio.

Figure 2:
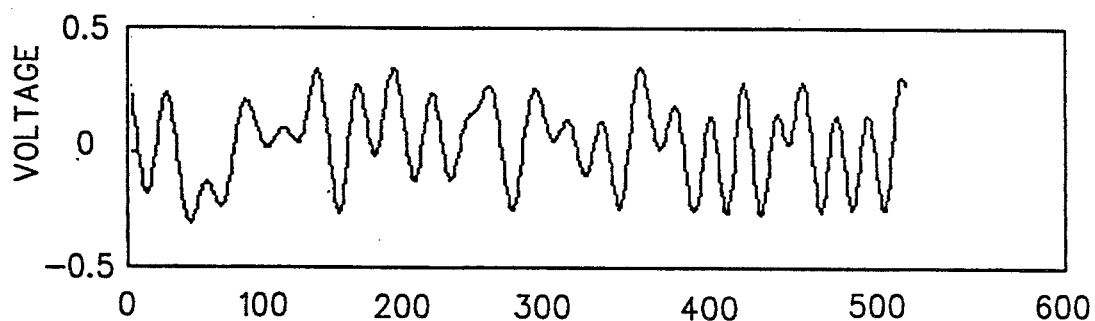
FIGS. 2-4 show time domain waveforms of a signal with different signal to noise ratios.
Figure 3:
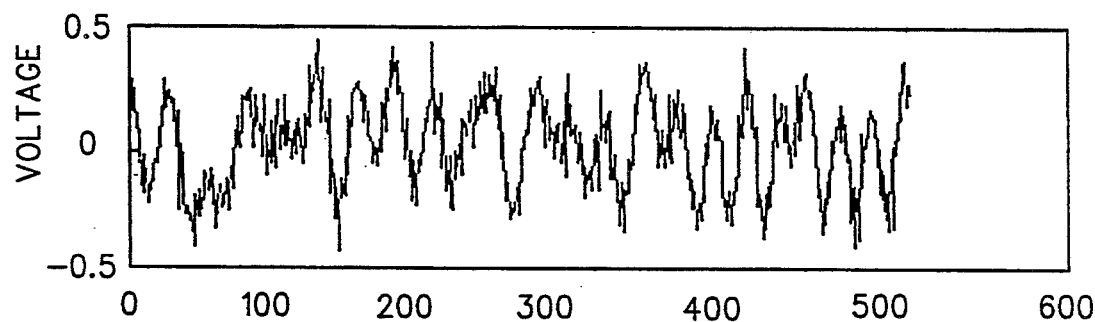
Figure 4:
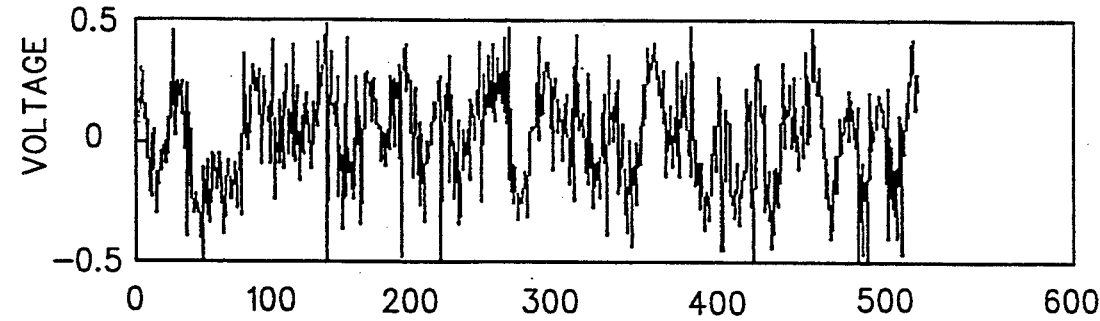
Figure 5:
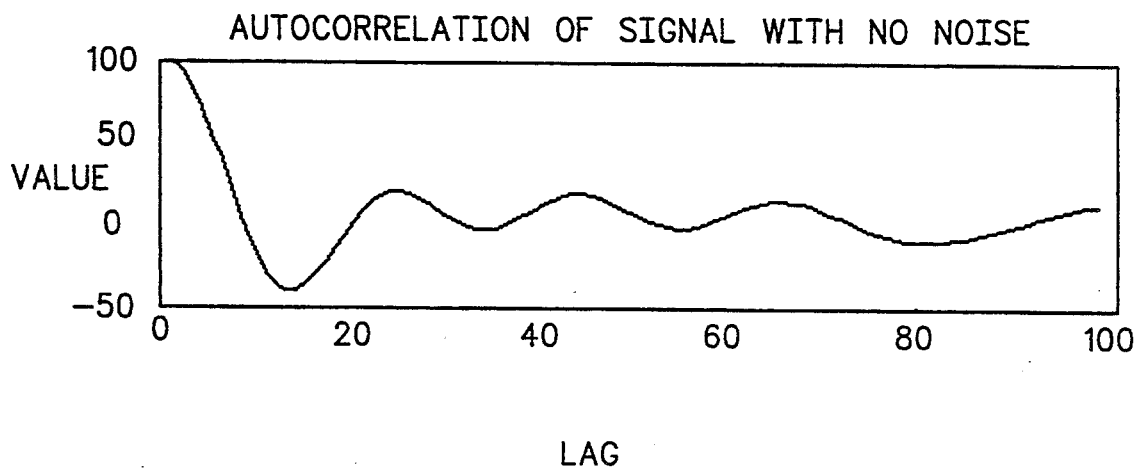
FIGS. 5-7 show the autocorrelation of the waveforms shown in FIGS. 2-4.
Figure 6:
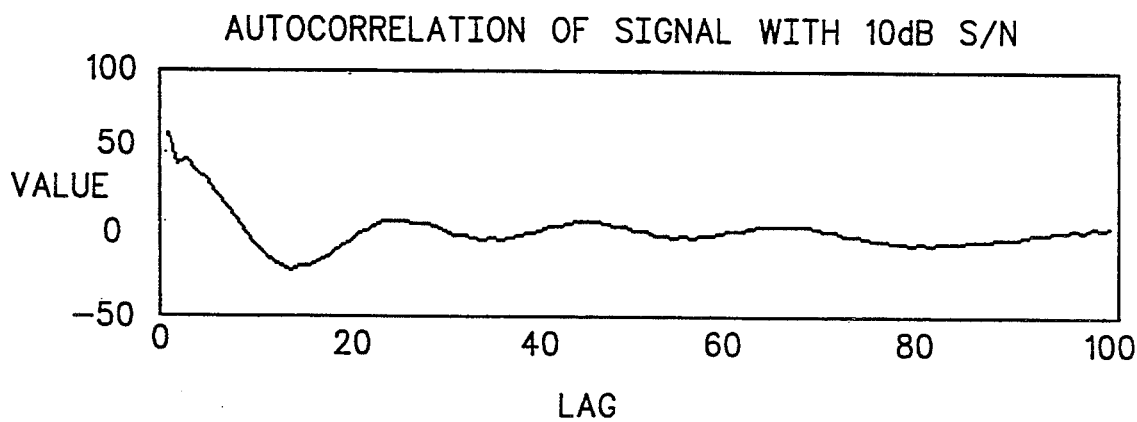
Figure 7:
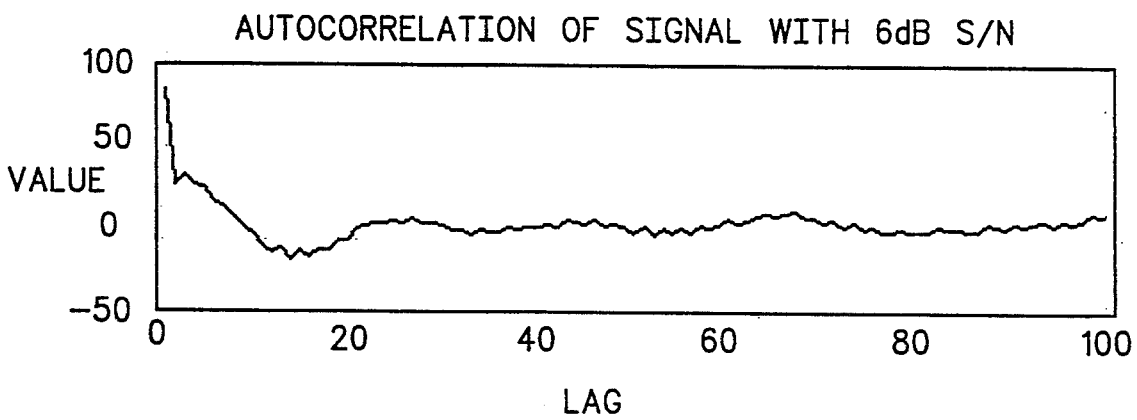

Referring now to FIGS. 2-4, there are shown time domain waveform diagrams which have been produced by computer simulation showing different signal conditions under different S/N levels. The simulation data shown in FIGS. 2-4 are 4-level digital signals which are pulse-shaped by a square root of raise-cosine filter, with the noise being FM modulated Gaussian noise. The binary data was generated by a random number generator, and the sampling frequency was set at 48 KHz. FIGS. 5-7 show the autocorrelation functions of the waveforms shown in FIGS. 2-4, respectively.

Figure 8:
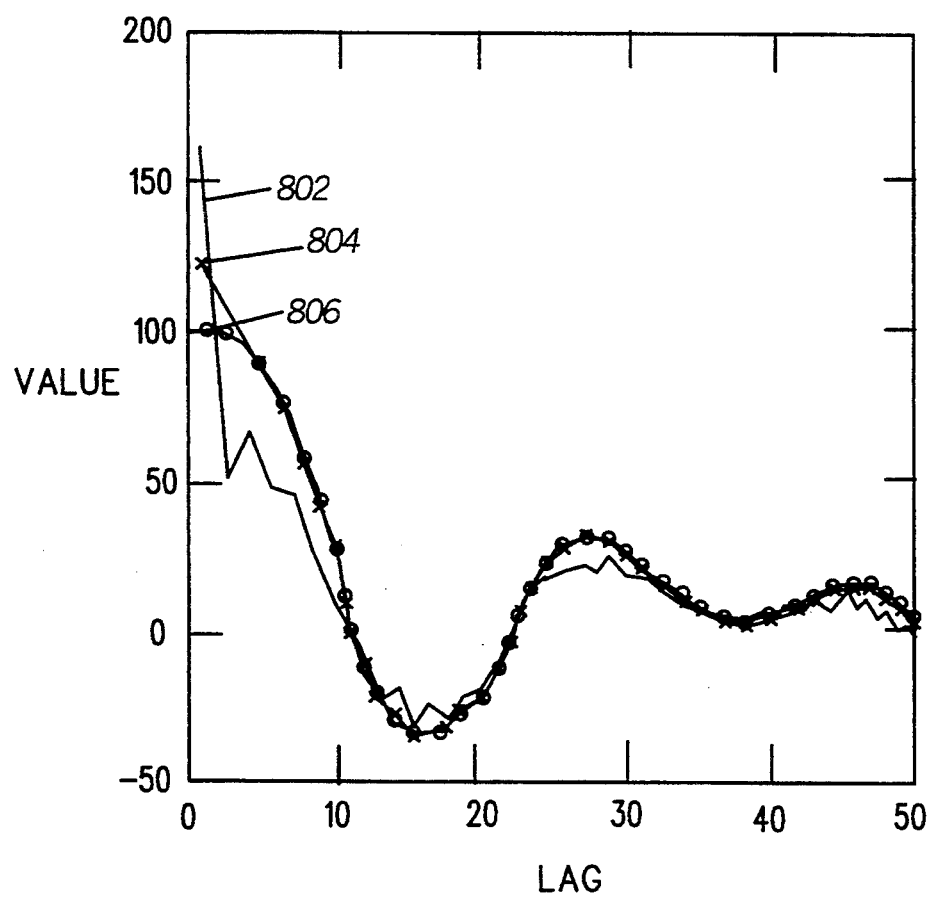
FIG. 8 shows a plot of the autocorrelation function of FIGS. 5-7 over different lag values.

In FIG. 8, a plot of the three autocorrelation signals previously described are shown. Line 802 shows the autocorrelation function of the signal with 6 dB (6 decibel) signal-to-noise (S/N) ratio, line 804 (X's) shows the autocorrelation function of the signal with 10 db S/N and line 806 (O's) shows the autocorrelation function of the signal with no noise. As FIG. 8 shows, $R_{rr}(\tau)$ for $\tau > 4$, does not vary much as the signal to noise ratio changes. This is because the noise term n(t) does not contribute to $R_{rr}(\tau)$ for $\tau > 4$. But for $\tau = 0$, $R_{rr}(\tau)$ increases as the signal to noise ratio decreases. As a result, $R_{rr}(0)$ is a good noise power indicator which can show digital signal quality effectively.

Figure 9:
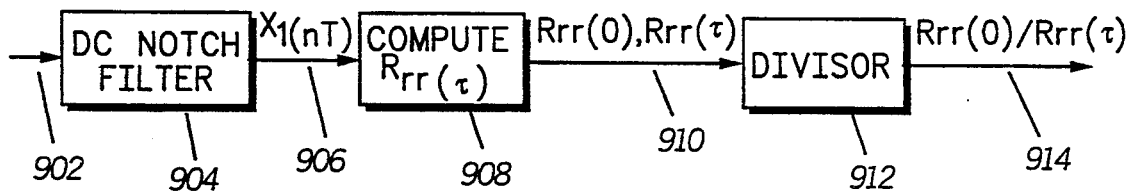
FIG. 9 shows a simplified block diagram of a receiver section in accordance with the present invention.

Referring to FIG. 9, there is shown a block diagram of a receiver section in accordance with the present invention. In this implementation it will be assumed that $f_s$ equals 48 Khz and the symbol rate equals 4.8 K symbols/second (10 samples per symbol). The received signal 902 is first sent to a DC notch filter 904 which is used to eliminate the frequency offset which may create a DC bias for the estimator. Once the signal has gone through filter 904, the filtered signal $X_1(nT)$ is sent to correlator 908 where $R_{rr}(\tau)$ is calculated. The output of correlator 908, $R_{rr}(0)$, $R_{rr}(\tau)$ 910, is sent to a divider circuit 912. Divider circuit 912 divides $R_{rr}(0)$ by $R_{rr}(\tau)$, which provides an output signal $R_{rr}(0)/R_{rr}(\tau)$ 914 which can be used as a S/N ratio which can be used to determine the quality of the received signal.

Figure 10:
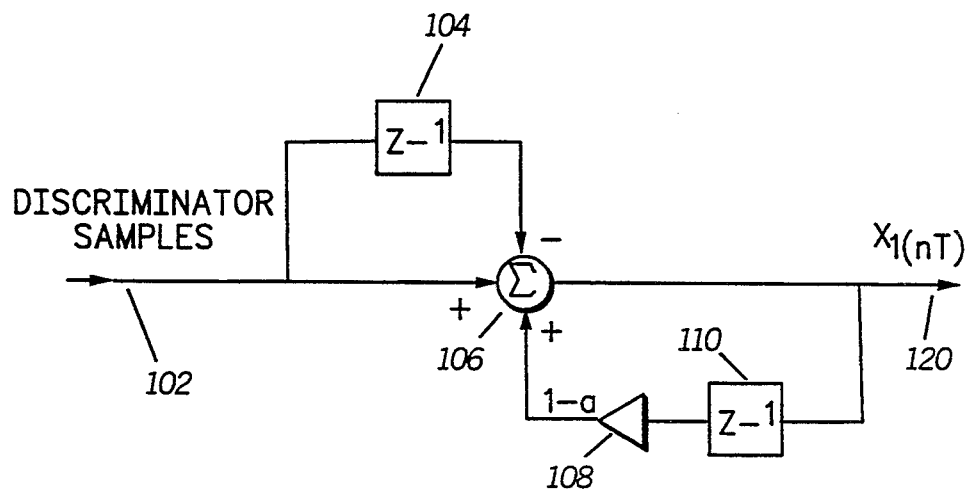
FIG. 10 shows a block diagram of a DC notch filter in accordance with the present invention.

In FIG. 10, a block diagram of DC notch filter 904 is shown. The input signals 102 received by the DC notch filter are digital samples coming from the discriminator circuit of a digital receiver circuit (not shown). The received signals are sent to the first input terminal of summer 106 while at the same time input signals 102 are routed to a delay circuit 104. The delay circuit 104 delays the input signal 102 by one "T" (sampling period) as denoted by $Z^{-1}$ which generates a lag. The delayed signal at the output of delay circuit 104 is routed to the second input (−) of summer circuit 106. The output of summer 106 is fed back into the summer's third input a second delay circuit 110 and amplifier 108. Delay circuit 110 delays the output signal by one "T" similar to delay circuit 104. The "a" in amplifier 108 determines the notch bandwidth with $0 < a < 1$.

Figure 11:
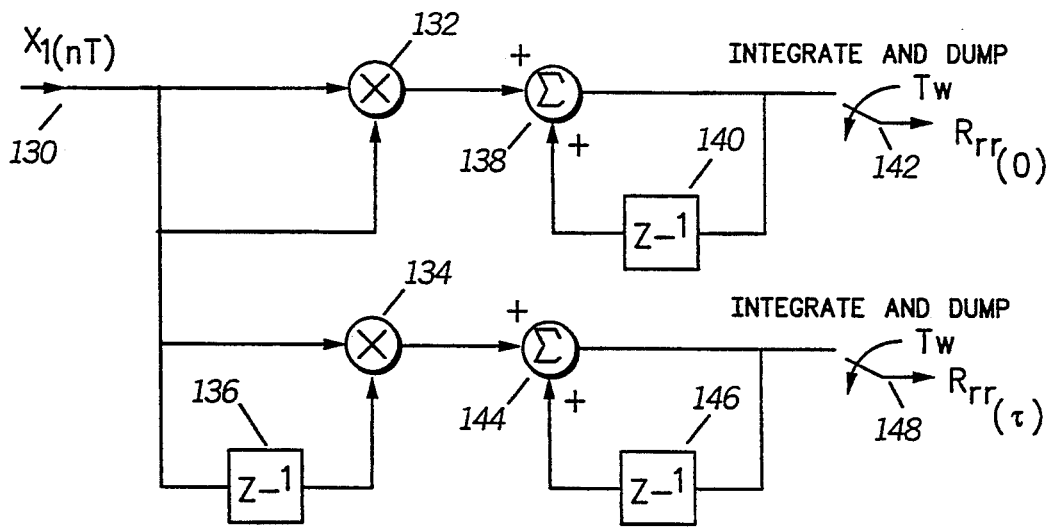
FIG. 11 shows a block diagram of a correlator in accordance with the present invention.

In FIG. 11, a block diagram of the components of correlator 908 are shown in accordance with the present invention. The input to the correlator $X_1(nT)$ 130 is applied to two sub-circuits each comprising a mixer, a summer and at least one delay circuit. In the first sub-circuit, the signal $X_1(nT)$ 130 is mixed with itself by mixer 132 and the output of the mixer is sent to the first input of summer 138. The output of summer 138 is fed back via delay circuit 140 which delays the output signal by one "T" prior to sending the signal to the second input of summer 138. The output signal is then applied to an integrate and dump circuit 142 which takes a snap shot of the value of the auto-correlation function at a particular instant of time. Once this snap shot is taken, the output of the summer 138 is cleared by the integrate and dump circuit 142. The output of the first sub-circuit is $R_{rr}(0)$.

The second sub-circuit of the correlator takes input signal $X_1(nT)$ 130 and applies it to the first input of mixer 134. Input signal 130 is also applied to a delay circuit 136 which delays the input signal by five "T" prior to in the preferred embodiment prior to applying the output to the second input of mixer 134. The output of mixer 134 is applied to the first input of summer 144. The output of summer 144 is fed back into the second input of summer 144 via delay circuit 146 which delays the signal by one "T". The output of summer 144 is applied to a second integrate and dump circuit 148 which takes a snap shot of the value of the auto-correlation function at a particular instant of time. Once this snap shot is taken, the output of the summer 144 is cleared by the integrate and dump circuit 148. The output of the second sub-circuit is $R_{rr}(\tau)$ in this particular embodiment $\tau$ is equal to 5T.

In order to eliminate the problem associated with the data pattern, the autocorrelation function is calculated over a sufficiently long observation time $T_w$ in which the data pattern can be assumed to be random. In a particular example, the ASTRO TM radio manufactured by Motorola, Inc. uses a 4-level signal, and a 100 symbol time (100 symbol/4800 symbol/sec) which equals 20.8 milli-seconds. A time which is long enough to ensure that the data pattern is random within the observation time. Divisor 912 simply divides $R_{rr}(0)$ by $R_{rr}(\tau)$ which in this particular example is $R_{rr}(0)/R_{rr}(5T)$. The output of the divisor can be used as a S/N ratio to determine the received signal quality.

Figure 12:
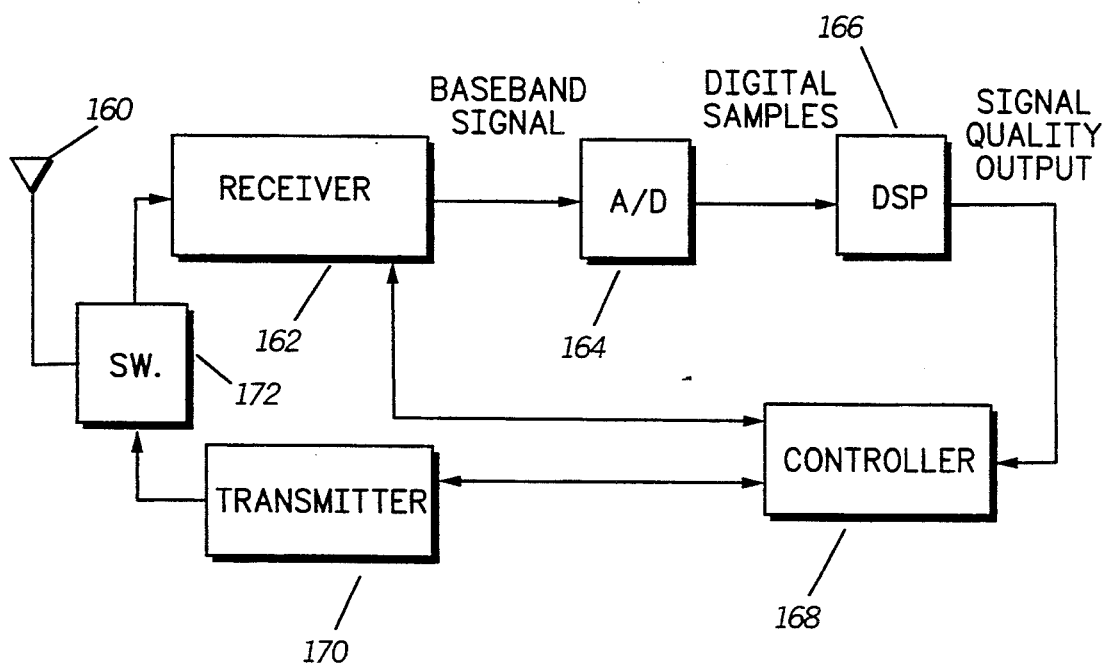
FIG. 12 shows a block diagram of a digital radio in accordance with the present invention.

Referring now to FIG. 12, there is shown a block diagram of a communication device such as a radio in accordance with the present invention. The radio includes an antenna 160 for receiving radio waves. The received signal are then sent via an antenna switch 172, such as a duplexer, to a receiver 162 which can be an FM receiver. Receiver 162 includes a demodulation means for demodulating the received signals. Receiver 162 provides a baseband output which is sent to an analog-to-digital circuit (A/D) 164 were the analog baseband signals are converted into digital format. The digital information is then sent to a digital-signal-processor (DSP) 166 were the digital samples are processed in accordance with the present invention. One such DSP which may be used with the present invention is the DSP 56000 or any of its variations available from Motorola, Inc.

DSP 166 includes a calculation means which calculates the autocorrelation function of the received signals. In the preferred embodiment DSP 166 also includes a storage means (memory locations) for storing values which represent different signal quality measurements (e.g., S/N ratios, etc.). These prestored values are determined for different signal to noise conditions and stored in DSP 166. DSP 166 also includes a means for determining the value of the autocorrelation function at different discrete reference points. Then, DSP 166 preferably takes the ratio of the reference numbers and compares the ratio to the prestored values. Once a comparison is made with the prestored values, DSP 166 provides a signal output which acts as a signal quality indicator for use by the receiver. DSP 166 can then send the signal quality information to the main radio controller 168 for further processing. Controller 168 can be a microprocessor such as an M68HC11 available from Motorola, Inc. Conventional FM transmitter 170 provides transmission capabilities to the radio. Although the preferred embodiment has DSP 166 calculating the ratio of two discrete point in the autocorrelation function, other similar ways of using the autocorrelation function to determine the signal quality can be used as easily. For example, DSP 166 can compare different discrete points of the autocorrelation function directly to values prestored in DSP 166, etc.

As an example of the preferred embodiment, the symbol rare for the ASTRO ™ radio previously described is a QPSK-c signal at 4800 symbols per second. If the FM receiver's discriminator output waveform is sampled at 48 KHz and k=0 and 5 as the reference points (discrete points). By applying a clean signal (signal with almost no noise) to the receiver of FIG. 12 and measuring the ratio of $$Q = \frac{R_{rr}(0)}{R_{rr}(5T)}.$$

The above procedure is repeated for various signal conditions (different S/N ratios) and a table of threshold levels is stored in DSP 166. This table can then be used by the receiver in FIG. 12 as a reference for determining the signal quality of incoming signals. As the incoming signals are received, the autocorrelation function of the signal is determined. Then in the preferred embodiment, the ratio of the values of the autocorrelation function taken at two discrete points is computed and compared to the stored values in DSP 166 in order to provide a signal quality output. In general, the ratio would be a monotonically increasing ratio as the signal conditions gets worse.

In summary, the present invention shows that a digital signal quality indicator can be implemented by using the autocorrelation of the received signal. Due to the simplicity of this approach, the present invention saves a significant amount of processor loading and reduces the response time of the indicator. In the particular application shown above, the response time of the indicator was shown to equal 20.8 ms and the processor loading was equal to the loading a processor would have using a 6-tap FIR filter.

While the preferred embodiments of the invention have been illustrated and described, it will be clear that the invention is not so limited. For example, other ways other than by taking the ratio of two reference points of the autocorrelation function can be used to determine the quality of the incoming signal (e.g., comparing a few discrete points on the autocorrelation function to to values stored in memory in order to approximate the signal quality, etc.). Numerous modifications, changes, variations, substitutions and equivalents will occur to those skilled in the art without departing from the spirit and scope of the present invention as defined by the appended claims.

What is claimed is:

1. A method for determining the signal quality of a received carrier signal modulated with a digital signal, comprising the steps of:
   (a) a demodulating the carrier signal to recover the digital signal;
   (b) calculating the autocorrelation function of the digital signal;
   (c) determining the signal quality of the digital signal using the autocorrelation function by performing the sub-steps of:
      (c1) determining the value of the autocorrelation function at first and second reference points; and
      (c2) producing a signal quality indication by taking the ratio of the value of the autocorrelation function at the first reference point against the value of the autocorrelation function at the second reference point.

2. A method as defined in claim 1, wherein step (c) comprises the further step of:
   determining if the value determined in step (c1) matches a value stored in a table.

3. A method as defined in claim 1, wherein the second reference point is a sample delay which equals zero.

4. A method as defined in claim 2, wherein each value stored in the table of step (c2) represents a different signal quality measurement.

5. A method as defined in claim 4, wherein each signal quality measurement represents a different signal-to-noise ratio (S/N).

6. A receiver for determining the signal quality of a received carrier signal modulated with an information signal, the receiver comprising:
   demodulator means for demodulating the received carrier signal to produce a demodulated signal;

calculation means responsive to the demodulator means for calculating the autocorrelation function of the demodulated signal;

determination means coupled to the calculation means for determining the value of the autocorrelation function at first and second reference points; and ratio generation means coupled to the determination means for producing a signal quality indication by taking the ratio of the value of the autocorrelation function at the first reference point against the value of the autocorrelation function at the second reference point.

7. A receiver as defined in claim 6, further comprising:

storage means coupled to the ratio generation means for storing a list of predetermined values; and comparison means coupled to the memory means for comparing the value of the ratio produced by the ratio generation means with the predetermined list of values.

8. A receiver as defined in claim 6, wherein the information signal is a digital signal.

9. A receiver as defined in claim 6, wherein the demodulated signal is converted to a digital format by an analog-to-digital converter which is coupled to the demodulator means.

10. A receiver as defined in claim 6, wherein the second reference point is a sample delay which equals zero.

11. A receiver as defined in claim 7, wherein each value in the predetermined list of values represents different signal-to-noise ratios (S/N).

12. A radio for determining the signal quality of a received carrier signal modulated with a digital signal, the receiver comprising:

demodulator means for demodulating the received carrier signal to produce a demodulated signal;

calculation means responsive to the digital signal for calculating the autocorrelation function of the digital signal;

determination means coupled to the calculation means for determining the value of the autocorrelation function at first and second reference points; and ratio generation means coupled to the determination means for producing a signal quality indication by taking the ratio of the value of the autocorrelation function at the first reference point against the value of the autocorrelation function at the second reference point.

13. A radio as defined in claim 12, wherein the digital signal which modulates the carrier signal is a multi-level digital signal.

14. A radio as defined in claim 12, wherein the calculation means comprises a digital signal processor (DSP).

* * * * *